(12) United States Patent
Poulbot

(10) Patent No.: US 6,851,307 B2
(45) Date of Patent: Feb. 8, 2005

(54) METHOD FOR DETERMINING COMPONENTS OF FORCES EXERTED ON A TIRE

(75) Inventor: Valery Poulbot, Les Martres-d'Artiere (FR)

(73) Assignee: Michelin Recherche et Technique S.A., Grange-Paccot (CH)

( * ) Notice: Subject to any disclaimer, the term of this patent is extended or adjusted under 35 U.S.C. 154(b) by 48 days.

(21) Appl. No.: 10/302,003

(22) Filed: Nov. 22, 2002

(65) Prior Publication Data

US 2003/0094039 A1 May 22, 2003

Related U.S. Application Data

(63) Continuation of application No. PCT/EP01/05999, filed on May 25, 2001.

(30) Foreign Application Priority Data

May 26, 2000 (FR) .............................................. 00 07079

(51) Int. Cl.⁷ .............................................. G01N 17/02
(52) U.S. Cl. .......................................... 73/146; 701/29
(58) Field of Search ................................. 73/146, 146.8, 73/862.041; 152/152.1

(56) References Cited

U.S. PATENT DOCUMENTS

| | | | | |
|---|---|---|---|---|
| 3,977,343 A | * | 8/1976 | Gauche et al. | 123/373 |
| 5,913,240 A | * | 6/1999 | Drahne et al. | 73/146 |
| 5,964,265 A | * | 10/1999 | Becherer | 152/152.1 |
| 2003/0000316 A1 | * | 1/2003 | Isono | 73/862.041 |
| 2003/0149515 A1 | * | 8/2003 | Hessmert et al. | 701/29 |

* cited by examiner

Primary Examiner—Edward Lefkowitz
Assistant Examiner—Andre Allen
(74) Attorney, Agent, or Firm—Alan A. Csontos; E. Martin Remick

(57) ABSTRACT

The invention relates to a method for determining a transverse component (Fy) of a resultant of forces exerted through the roadway (3) on an area of contact (2) of a tire (1). The transverse component (Fy) is deduced from at least one measurement of the angular circumferential deformation in at least one first side wall (4) of the tire (1) at a first fixed point (B) in space which is located at an azimuth (φ) along the circumference of the tire (1).

7 Claims, 4 Drawing Sheets

METHOD FOR DETERMINING COMPONENTS OF FORCES EXERTED ON A TIRE

This is a continuation of prior application No. PCT/EP01/05999, filed on May 25, 2001.

BACKGROUND AND SUMMARY OF THE INVENTION

The present invention relates to vehicles, their connection to the ground and the measurement of the forces exerted through the roadway on the tires of the vehicles.

The present invention also relates to various electronic assistance devices used, for example, for the antilock brake control of a vehicle or the antiskid control of the driving wheels, the control of the course of a vehicle, or indeed other forms of control or monitoring, such as that of the tire pressure.

In order to control the behavior of a vehicle, the attempt has been made to determine certain running parameters. Thus, in order to reduce longitudinal sliding of the wheels, systems for limiting slide (ABS, ASR) have been developed which are capable of modifying the torque transmitted to the wheel from the engine or the brake as a function of the slide deduced from the variations in the speed of rotation of each wheel. It has also been proposed that the torsion (angular circumferential deformation) of the side walls of a tire be measured in order to determine the variations in the torque transmitted to the roadway. This measurement, which is more direct than deduction from the variation in the speed of rotation, may allow finer regulation of the slide limitation systems.

Also known are systems (such as ESP) which act on the brakes or the driving power applied to the wheels to ensure that the course desired by the driver is indeed followed by the vehicle. For this, the yaw speed (the speed of rotation of the vehicle about a vertical axis), the running speed, the transverse acceleration of the vehicle and the angular position imposed on the steering wheel by the driver are generally measured simultaneously.

The invention takes as its starting point the observation that all the forces exerted through the roadway on the vehicle are transmitted through the wheels. The accelerations undergone by the vehicle depend on the overall effect of these forces. Thus, determining these forces as a whole could allow the different sensors mentioned above to be dispensed with. To do this, the known methods (see above) may allow the longitudinal forces to be known. The vertical forces may also be measured by various known methods. To determine in a complete manner the overall effect of the forces exerted through the roadway on the vehicle, all that remains to be known are the transverse forces. It is an object of the invention to determine these in simple and reliable manner.

The method according to the invention is based on the experimental finding that the transverse forces acting between the tread of the tire and the roadway result in a substantial and reproducible deformation in the form of a circumferential torsion of the side walls of the tires. If this angular circumferential deformation is successfully measured in isolated manner in real time, it may allow the direction and intensity of the transverse forces acting on the tire to be known at any given moment.

The invention relates to a method for determining a transverse component of a resultant of forces exerted through the roadway on an contact area of a tire, the method being characterized in that the transverse component is deduced from at least one measurement of the angular circumferential deformation in at least one first side wall of the tire at a first fixed point in space which is located at an azimuth along the circumference of the tire which differs from the azimuth of the center of the area of contact and differs from the azimuth of the point opposite the center of the area of contact.

The invention also relates to a method as described above, characterized in that such a measurement is performed respectively in each side wall to obtain a first measurement and a second measurement and the transverse component is deduced from the difference between the first and second measurements.

The method according to the invention also makes it possible to deduce from the measurement of the torsion of the side walls of the tires the other (or one of the other) components of the resultant of the forces exerted on the area of contact, that is to say not only the transverse forces (called the "y" forces) but also the longitudinal forces (called the "x" forces) and the vertical forces (called the "z" forces) as are exerted between the tire and the roadway.

The invention thus also relates to a method as described above and characterized in that there is furthermore performed a such measurement in the first side wall at a second fixed point in space which is distinct from the first point and located at an azimuth substantially opposite the first point in order to obtain a third measurement, and in that a longitudinal component of the resultant of forces exerted through the roadway is furthermore deduced from the sum of the first and third measurements.

Preferably, the invention relates to a method as above where a vertical component of a resultant of forces exerted through the roadway is furthermore deduced from the difference between the third and first measurements and a contribution of the transverse component.

These different components participate differently but simultaneously in the deformations of the tire and in particular in the tangential displacement of the crown (or tread) with respect to the hook zone (or bead) on the rim. This angular circumferential deformation (or torsion of the side walls), which is more or less homogeneous along the circumference of the tire, takes the form of a deflection of the carcass reinforcements in the case of tires with a radial carcass. This is often called a "deradialization". The method according to the invention does not, however, apply only to tires with a radial carcass, but, rather, the behavior of radial reinforcements, that is to say, those substantially parallel to the radii of the tire, enables a "practical illustration" to be given.

BRIEF DESCRIPTION OF THE DRAWINGS

The bases and principles of the invention will emerge more clearly with the aid of the following figures.

DETAILED DESCRIPTION OF THE INVENTION

Figure 1:
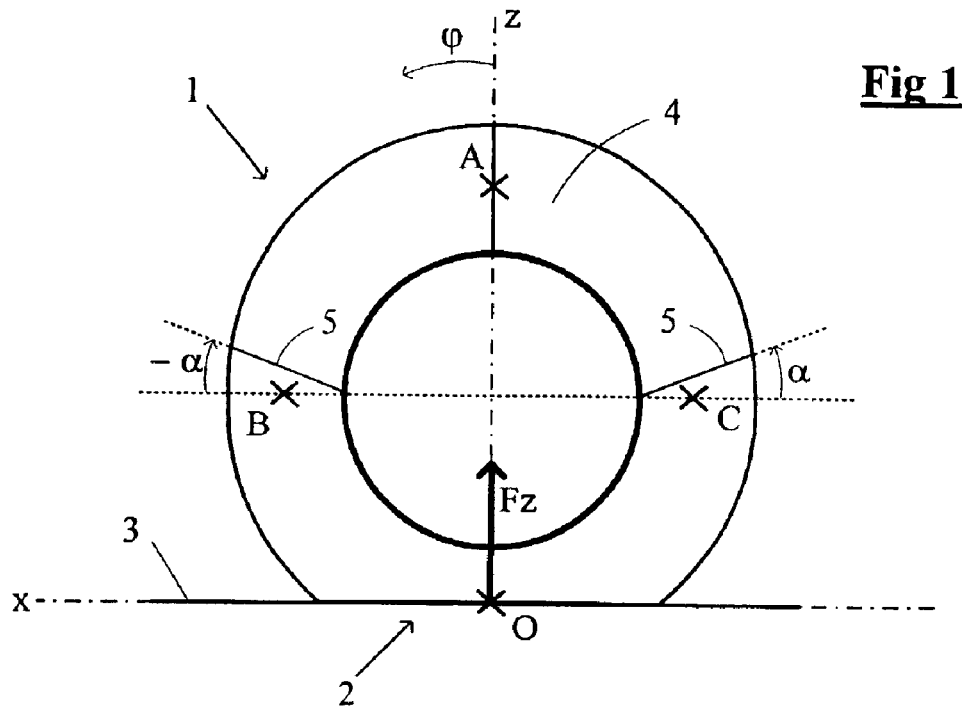
FIG. 1 shows a diagram of a tire undergoing a vertical force Fz in its area of contact.

FIG. 1 shows diagrammatically the deformation of the side walls of a tire under the sole effect of a vertical force Fz transmitted through the roadway.

The tire (1) is deformed in order to form its contact area (2) on the roadway (3). This deformation brings about a displacement of certain parts of the tread with respect to the parts of the bead opposing them when the tire is not undergoing any deformation. These displacements are easy to figure out when one represent the change (magnified in the figure) in the orientation of the carcass reinforcements (5) in a side wall (4) of a tire with a radial carcass. It goes without saying that the principle of the invention does not apply only to radial tires, but this illustration is advantageous to the clarity of the explanation. Thus, we find (see also FIG. 4), under a vertical force Fz, an angular deformation of the radial reinforcements (5) of the side wall (4) which is symmetrical with respect to a vertical axis. If the circumference of the tire is taken as a reference, as a function of an azimuth $\phi$ (zero at the top of the tire, in this case point A, and the positive direction being counterclockwise), the angular deformation $\delta 1$ assumes a value $-\alpha$ with respect to point B ($\phi=+90°$) and an opposing value $+\alpha$ with respect to point C ($\phi=+270°$ or $-90°$). At point A ($\phi=0°$), the angular deformation $\delta 1$ is zero. It goes without saying that the value of $\alpha$ varies for a given type of tire as a function of the intensity of the vertical force Fz but also as a function of the internal pressure P. The deformations found are equivalent on each side wall of the tire.

| Point in question | A | B | C |
|---|---|---|---|
| Azimuth $\phi$ | 0° | +90° | +270° |
| Angular deformation $\delta 1$ | 0° | $-\alpha$ | $+\alpha$ |

Figure 2:
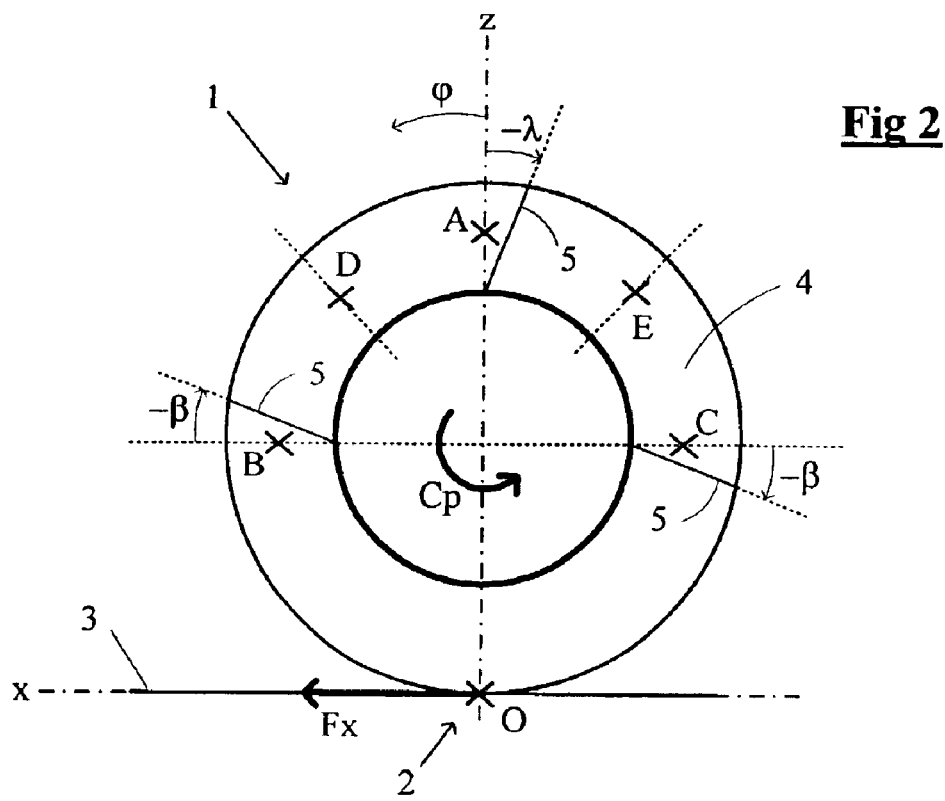
FIG. 2 shows a diagram of a tire undergoing a longitudinal force Fx in its area of contact.

FIG. 2 shows diagrammatically the deformation of the side walls of a tire under the sole effect of a longitudinal force Fx transmitted through the roadway. This illustration is simplified in that without being under load, that is to say, without any force Fz, a tire cannot undergo any force in the plane of the ground, but this simplification allows the various elements of the deformation of the side walls of the tire to be illustrated individually. This force Fx generally has its origin in a torque Cp applied to the wheel by the engine or the brakes of the vehicle. The tire (1) then undergoes a torsion in the same direction but of a different intensity along its entire circumference. Using the same type of illustration as in FIG. 1, we find (see also FIG. 4), under a longitudinal force Fx, an angular variation $\delta 2$ equal to $-\beta$ for points B and C and $-\lambda$ for point A. The angle $\lambda$ is less than $\beta$, and these two angles are linked to one another by a transfer function specific to the tire characteristics. The angle $\beta$ (and $\lambda$) varies, for a given type of tire, as a function of the longitudinal force Fx and the internal pressure P. The deformations found are equivalent on each side wall of the tire.

| Point in question | A | B | C |
|---|---|---|---|
| Azimuth $\phi$ | 0° | +90° | +270° |
| Angular deformation $\delta 2$ | $-\lambda$ | $-\beta$ | $+\beta$ |

The principles and behavior described in FIGS. 1 and 2 are known to those skilled in the art.

Figure 3A:
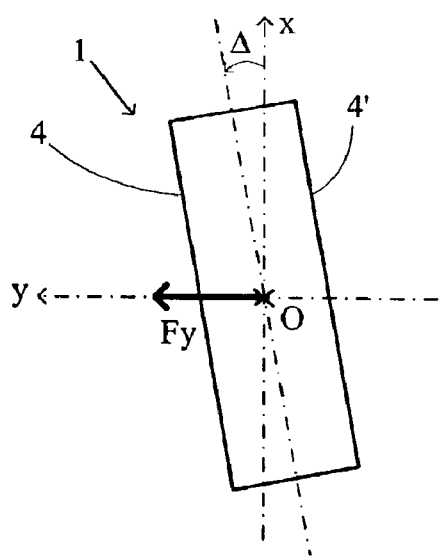
FIG. 3a shows a diagram of a tire, as viewed from overhead, undergoing a transverse force Fy in its area of contact.

FIG. 3a shows a diagram, in plan view from above, of the transverse operation of the tire (1), also called the "slip angle operation"The plane of the wheel forms a slip angle $\Delta$ with its course (along OX). It is possible to define the side walls (4, 4') with respect to the direction of slip. In order to transmit to the tire a transverse force Fy in the direction illustrated in FIG. 3a, the tire must have a positive angle of slip (for example steering towards the left for a tire rolling upwards in the figure). In this configuration, the side wall (4) (the inside side wall, with respect to the curved course) is the trailing side wall and the opposing side wall (4') (the outside side wall, with respect to the curved course) is the leading side wall.

Figure 3B:
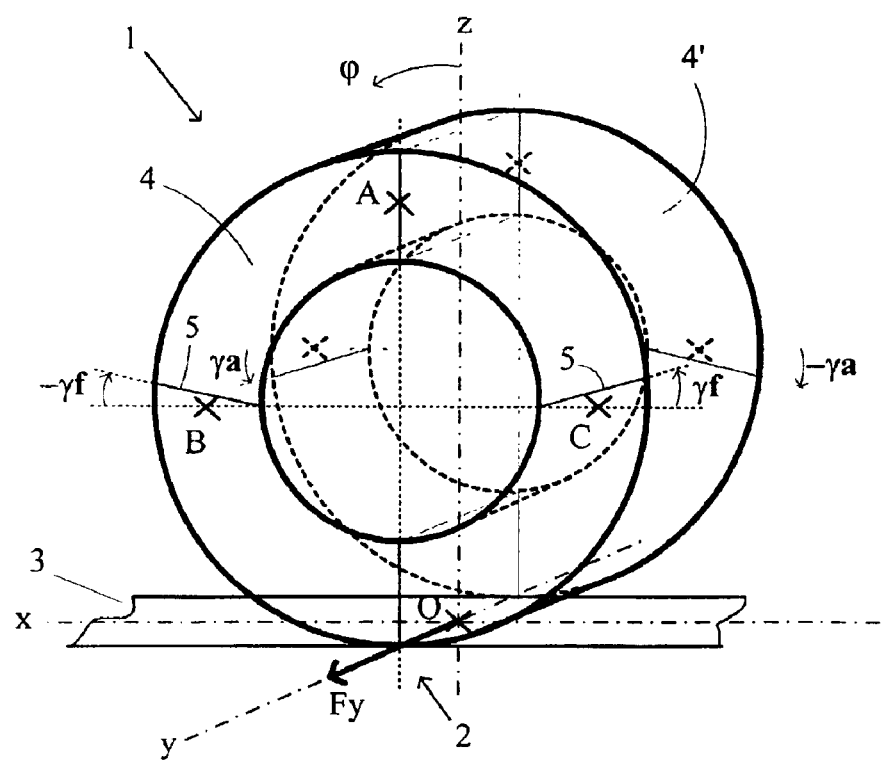
FIG. 3b shows a diagram of the tire of FIG. 3a as viewed in perspective, undergoing a transverse force Fy in its area of contact.

FIG. 3b shows diagrammatically the deformation of the side walls of the tire (1) from FIG. 3a under the sole effect of this transverse force Fy transmitted through the roadway. This force Fy generally has its origin in a transverse acceleration, for example in the event of a curved course followed by the vehicle. As above, this illustration is simplified in that without being under load, that is to say without any force Fz, a tire cannot undergo any force in the plane of the ground, but this allows the various elements of deformation of the side walls of the tire to be illustrated individually. We find (see also FIG. 4) that a transverse force Fy exerted in the contact area brings about, on each side wall, a substantially symmetrical signature (symmetrical with respect to a vertical center axis of the tire) as regards the variation of the orientation of radial reinforcements (5). This signature is different from one side wall (4) to the other (4'). With these conventions, on the leading side wall (4'), the angular deformation $\delta 3a$ goes to zero at point A ($\phi=0°$), and has the value $+\gamma a$ at points B ($\phi=90°$) and $-\gamma a$ at point C ($\phi=+270°$). On the trailing side wall (4), the angular deformation $\delta 3f$ goes to zero at point A ($\phi=0°$), and has the value $-\gamma f$ at point B ($\phi=+90°$) and $+\gamma f$ at point C ($\phi=+270°$). The angles $\gamma a$ and $\gamma f$ vary (for a given tire) as a function of the transverse force Fy and the pressure P. From this we can draw up the table below:

| Point in question | A | B | C |
|---|---|---|---|
| Azimuth $\phi$ | 0° | +90° | +270° |
| Angular deformation $\delta 3a$ (leading side wall) | 0° | $-\gamma a$ | $-\gamma a$ |
| Angular deformation $\delta 3f$ (trailing side wall) | 0° | $-\gamma f$ | $+\gamma f$ |

Figure 4:
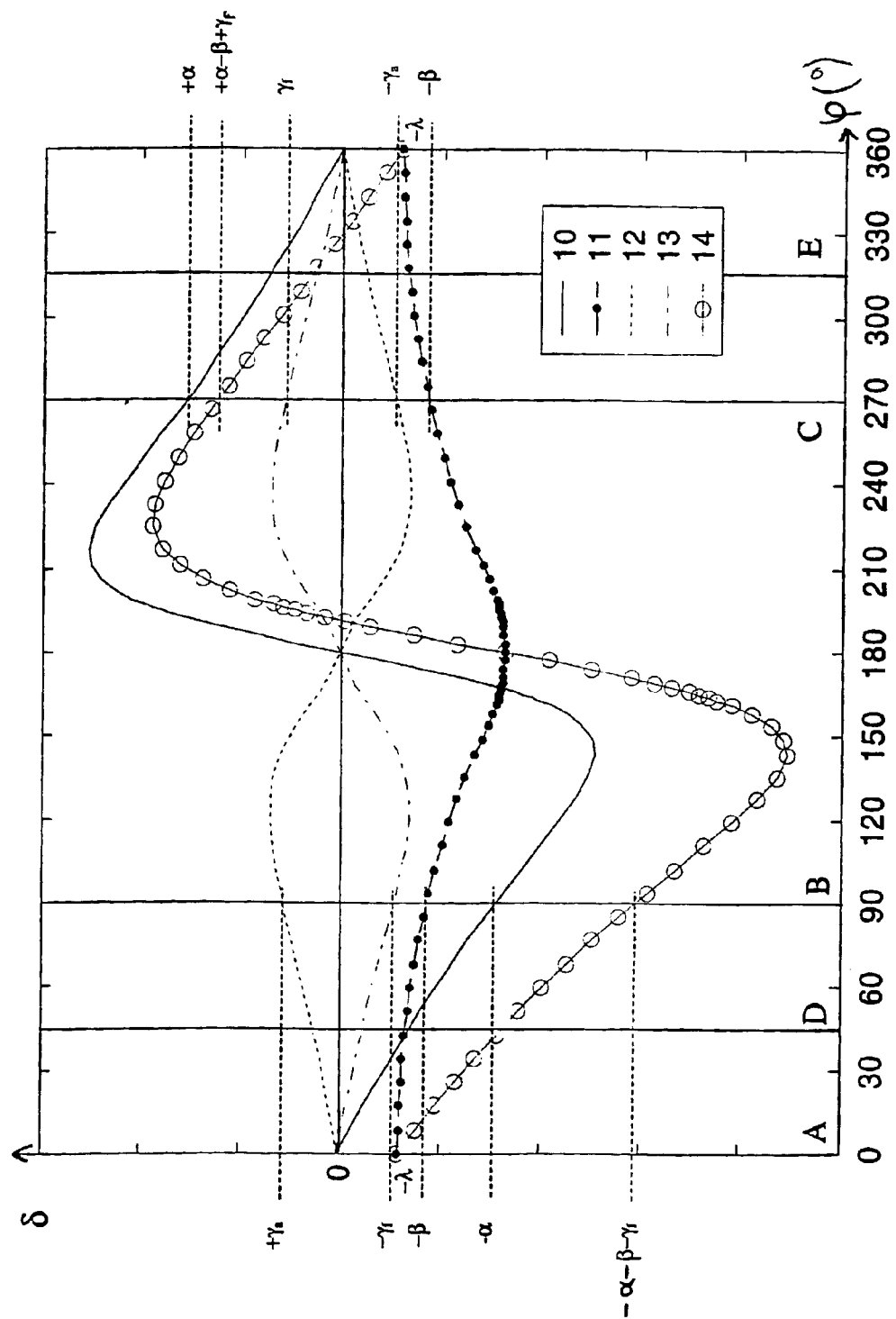
FIG. 4 shows a diagrammatic graph of the angular circumferential deformation brought about by each type of force as a function of the azimuth.

FIG. 4 illustrates diagrammatically, as a function of the azimuth $\phi$ in question along the circumference of the tire, an example of the variations found in the angular circumferential deformation caused by each type of force undergone by the tire. This example is for the case of a passenger-car mid-size radial tire under an internal pressure of 2.1 bar. A different example would of course give different values but similar graph profiles. The curve 10 illustrates the variation $\delta 1$, that is to say the effect of a positive vertical force Fz (see FIG. 1) of 400 daN. The curve 11 illustrates the variation δ2, that is to say the effect of a positive longitudinal force Fx (see FIG. 2) of 100 daN. The curve 12 illustrates the variation δ3a, that is to say the effect on the leading side wall (4') of a positive transverse force Fy (see FIG. 3b) caused by a positive slip angle Δ of 1 degree. The curve 13 illustrates the variation δ3f, that is to say the effect of the same positive transverse force Fy, but measured on the trailing side wall (4). The curve 14 illustrates the sum of δ1+δ2+δ3f. At points A (φ=0°), B (φ=+90°) and C (φ=+270°), we find on the different graphs the values from the tables above.

In reality, a tire simultaneously undergoes the effects (presented individually up until now) of the forces Fx, Fy, Fz. These forces represent the components (using a reference Oxyz linked to the area of contact) of the resultant of the forces transmitted through the roadway to the tire by way of the area of contact. The actual behavior of the tire, in particular its angular circumferential deformation, is thus a variable combination of the three behaviors which were deliberately separated from one another in the model of FIGS. 1 to 3b. It has been found that these three basic behaviors are superimposed on one another and the various angular deformations (δ1, δ2, δ3a,f) are to a large extent added together. Thus, if we take the example of FIG. 4 and measure the angular circumferential deformation δf of the trailing side wall (4 in FIG. 3b) as a function of the azimuth φ for a case where the tire undergoes the three components Fx, Fy, Fz simultaneously, we substantially arrive at the curve 14 formed by the sum of the curves δ1 (10), δ2 (11) and δ3f (13). This experimental finding of what is more or less a superimposition of the contributions of each component opens up numerous possibilities as regards measurement.

It is possible to combine the tables above if we consider that the angular circumferential deformation δ at each point (A, B, C) and on each side wall (4, 4') is the sum of the angular deformations linked to each component (Fx, Fy, Fz).

We then arrive at the table below:

| Point in question | A | B | C |
|---|---|---|---|
| Azimuth φ | 0° | +90° | +270° |
| Angular deformation δ1 (Fz) | 0° | −α | +α |
| Angular deformation δ2 (Fx) | −λ | −β | −β |
| Angular deformation δ3a (Fy) (leading side wall) | 0° | +γa | −γa |
| Angular deformation δ3f (Fy) (trailing side wall) | 0° | −γf | +γf |
| Angular deformation δa (Fx, Fy, Fz) (leading side wall) δa = δ1 + δ2 + δ3a | −λ | −α − β + γa | +α − β − γa |
| Angular deformation δf (Fx, Fy, Fz) (trailing side wall) δf = δ1 + δ2 + δ3f | −λ | −α − β − γf | +α − β + γf |

From this table, following the appropriate points (A, B, C) and the appropriate side wall (leading or trailing) we can proceed to the measurement of the angular deformation δ, and it then follows that in some conditions we can deduce from various equations the values either of each contribution (α, β, γa, γf) for these points or usable combinations of these contributions. This can allow us to determine the components Fx, Fy, Fz.

EXAMPLE 1

The transverse component Fy of the resultant of the forces undergone by the tire in its contact area is to be determined. This component comprises contributions δ3a or δ3f (depending on the side wall in question) to the angular circumferential deformation δ measured. On measuring, for example, at point B, the angular circumferential deformation δa(B) on the leading side wall (4') and the angular circumferential deformation δf(B) on the trailing side wall (4) and calculating the difference δa(B)−δf(B), we obtain in accordance with the table the following equation:

$$\delta a(B)-\delta f(B)=(-\alpha-\beta+\gamma a)-(-\alpha-\beta-\gamma f)=\gamma a+\gamma f$$

This quantity (γa+γf) is indeed representative of the contribution of Fy (see above). This means that the measurement δa(B)−δf(B) allows us to determine Fy. Moreover, it has been found that the transfer function linking Fy to (γa+γf) is close to a very simple form (first degree), which is advantageous from the point of view of precision. It should be noted that this method of determining Fy is completely independent of the other components (Fx and Fz), since their contributions (α, β) are eliminated when the difference is calculated. This method thus allows Fy to be determined by measuring the angular circumferential deformation δ at a single point on either side of the tire. This point may be located anywhere along the circumference of the tire, except at the center of the area of contact (point O) and opposite it (point A in the figures), since these points have no contribution in respect of Fy (see figures and tables).

EXAMPLE 2

The transverse component Fy of the resultant of the forces undergone by the tire in its contact area is to be determined. This component comprises contributions δ3a or δ3f (depending on the side wall in question) to the angular circumferential deformation δ measured. On measuring, for example, at point B, the angular circumferential deformation δf(B) on the trailing side wall (4) and, at point C, the angular circumferential deformation δf(C) on the trailing side wall (4) and calculating the difference δf(C)−δf(B), we obtain in accordance with the table the following equation:

$$\delta f(C)-\delta f(B)=(+\alpha-\beta+\gamma f)-(-\alpha-\beta-\gamma f)=2\alpha+2\gamma f$$

This quantity (2α+2δf) is representative of the sum of the contributions of Fz and Fy, respectively (see above). This means that the measurement δf(C)−δf(B) allows Fy to be determined if we also know Fz (and thus α) or vice versa. This method may thus be used to determine Fy by measuring the angular circumferential deformation δ at two points on the same side wall (inside or outside side wall). These points may be located anywhere along the circumference of the tire, except at the center of the area of contact and opposite it (point A in the figures), since these points have no contribution in respect of Fy (see figures and tables). It goes without saying that measuring two different points located on different side walls allows a similar determination to be made, for example:

$$\delta f(C)-\delta a(B)=(+\alpha-\beta+\gamma f)-(-\alpha-\beta+\gamma a)=2\alpha+\gamma f-\gamma a$$

The selection of the azimuths for measurement (angular position of points B et C) may be made as a function of the means used to measure the angular circumferential deformation. It is possible to establish Fz, and thus α, as is necessary, by any measurement of the load borne by the tire, which is carried out, for example, within the suspension system.

EXAMPLE 3

The method from Example 2 may be implemented with the reverse objective, that of determining Fz (that is to say α) while knowing Fy (or γa and/or γf). For example, by calculating the difference δf(C)−δf(B), we arrive at the following equation:

$$\delta f(C) - \delta f(B) = (+\alpha\beta + \gamma f) - (-\alpha - \beta - \gamma f) = 2\alpha + 2\gamma f$$

that is to say:

$$\alpha = \frac{1}{2}[\delta f(C) - \delta f(B)] - \gamma f$$

EXAMPLE 4

The transverse component Fy of the resultant of the forces undergone by the tire in its contact area is to be determined. This component comprises contributions δ3a or δf (depending on the side wall in question) to the angular circumferential deformation δ measured. On measuring, at point B, the angular circumferential deformation δf(B) on the trailing side wall (4), we obtain in accordance with the table the following equation:

$$\delta f(B) = -\alpha - \beta - \gamma f$$

This means that measurement δf(B) allows Fy to be determined if we also know α and β:

$$\gamma f = -\alpha - \beta - \delta f(B)$$

The component Fy is then determined from a transfer function linking it to γf.

EXAMPLE 5

The longitudinal component Fx of the resultant of the forces undergone by the tire in its contact area is to be determined as a function of the angular circumferential deformation δ measured. By measuring on the trailing side wall (4) the angular circumferential deformation δf(B) at point B and δf(C) at point C and by calculating the sum of δf(B)+δf(C), we obtain in accordance with the, table the following equation:

$$\delta f(B) + \delta f(C) = (-\alpha - \beta \gamma f) + (+\alpha - \beta + \gamma f) = -2\beta$$

This quantity (−2β) is indeed representative of the contribution of Fx (see above). This means that the sum of the measurements of δf(B)+δf(C) allows Fx to be determined. It should be noted that this method of determining Fx is completely independent of the other components (Fy and Fz) since their contributions (α, γ) are eliminated at the time of calculation.

EXAMPLE 6

It is also possible to determine the longitudinal component Fx by making a single measurement at point A (inside or outside side wall), since the angular circumferential deformation δa, f(A) is equal to −λ (see tables) because λ is linked to β and Fx.

EXAMPLE 7

The components Fx and Fy are to be determined by measuring the angular circumferential deformation δ, with Fz (and thus α) being known. One way to proceed is to determine Fx by the method of Example 6 (see above) and to determine Fy by the method of Example 4 (see above). Thus, by making a measurement at two points on the tire, for example at point A and point B on a single side wall, the method according to the invention allows the two components Fx, Fy to be determined when Fz (and thus α) is known by any method.

EXAMPLE 8

The three components Fx, Fy and Fz are to be determined by measuring the angular circumferential deformation δ. One way to proceed is to determine Fy by the method of Example 1 (see above), to determine Fx by the method of Example 5 (see above) and to determine Fz by the method of Example 3 (since γf is known if Fy is known, see above). Thus, by making a measurement at three points on the tire, for example at point B on each side wall and at point C on a single side wall, the method according to the invention allows the three components Fx, Fy and Fz to be determined.

Examples 1 to 8 in no way constitute an exhaustive list of the possibilities for implementing the method according to the invention. On the contrary, the person skilled in the art will know how to establish (for example from the tables above) a large number of variants, alternatives or different combinations of these few examples, for example as a function of the measuring means he or she intends to use or the measurements incidentally available because they are provided by other devices installed in the vehicle.

The necessary determination of transfer functions linking each contribution (α, β, λ, γa, γf) to the others or to each component (Fz, Fx, Fy) as a function of the positions selected for the measurement points (A, B, C) may be performed by experimental methods or by numerical calculation. The case of two transfer functions linking Fy to γa and γf is a particular one because, depending on the direction of the slip angle Δ, a specific side wall will either be the trailing side wall or the leading side wall. However, for a given azimuth ($\phi$), the sign of the contribution (δ3a,f) determined allows this ambiguity to be removed (see FIG. 4). These transfer functions depend on different variables linked to the type of tire and to a certain extent to the internal pressure of the tire. To take account of the variability of the pressure over time, it is possible to use the information from an independent pressure gauge. Conversely, it is possible to know, thanks to a sensor, the load Fz borne by the wheel and to calculate, from the value of the contribution α determined in accordance with the measurements of the angular circumferential deformation δ, the internal pressure P.

Selection of the position of points (A, B, C) is in principle unrestricted, since any combination of three distinct points on the circumference of the tire allows a similar calculation. However, the position of point A illustrated in the diagrams corresponds to a preferred embodiment of the invention, since in particular it makes it possible to determine directly the contribution (λ or β) resulting from the longitudinal force (Fx). Moreover, the symmetrical positioning of points B and C (and hence the azimuths being opposed) enables relatively simple equations, as we have seen in some of the examples. Azimuths selected at +90° and +270° (that is to say −90°) are cited here by way of example, since they make it easier to explain the invention. In fact, the closer points B and C are to the area of contact, the greater will be the angular variation measured (and thus potentially the greater the precision of measurement), but the more the installation of certain measurement means will be limited by the proximity of the roadway. A preferred embodiment of the invention corresponds to the case shown, where the azimuth ($\phi$) of the first point (B) is substantially equal to +90°. The only positions which are strictly impossible for points B et C are clearly those points corresponding to the center of the area of contact and the point opposite (point A in the figures), since these two points on the circumference of the tire do not undergo any effect from the components Fz and Fy as regards angular circumferential deformation.

Another embodiment of the invention which is particularly advantageous consists in performing the measurements at three points (C, D, E in FIG. 2) whereof the respective azimuths are approximately +270° (that is to say −90°), +45° and +315° (that is to say −45°). This second, preferred configuration in particular allows all the components Fx, Fy and Fz to be determined precisely by measuring three points on a single side wall. The use of points B, D and E, by way of symmetry, has the same advantages. The positions described here for points D and E are non-restrictive examples, since it will be understood that, just as above for points B and C, considerable latitude is possible. The difference with the configurations described above consists in the fact that no measurement is made at point A. This complicates the theoretical equations, since λ is no longer obtained independently, but on the other hand all the measurement points are affected by a contribution from each component Fx, Fy and Fz. This is advantageous for precision in cases where these three components are sought.

Another preferred measuring configuration is that constituted by the points A, C, E (or A, B, D by symmetry). This configuration is particularly advantageous for the precision of the determination of the transverse component Fy.

Alternatively, it is possible to establish directly the functions giving the components Fx, Fy and Fz as a function of measurements of the angular circumferential deformation of a tire at known azimuths of one side wall or both side walls of this tire. This direct determination of the functions giving the forces does not take account of each of their individual contributions to the angular circumferential deformation but only of the overall result. Determination of the transfer functions is not anymore necessarily based on an analysis of the mechanics of the tire, but on the response of the tire as regards the angular circumferential deformation to the forces it undergoes. Consequently, any couplings between the different contributions are immaterial as far as the precision of determining the functions is concerned. The method is carried out as follows:

A number, at least three, of measurement points located in given positions along the circumference of the tire (for example points C, D, E in FIG. 2) is considered, the hypothesis is taken that each component of the forces Fx, Fy and Fz is a polynomial function of degree n of the angular circumferential deformation (δC, δD, δE) measurable at the different measurement points (C, D, E), (for example where n=3, this hypothesis gives the following equations:

$$Fx = \sum_{\substack{i,j,k=0 \\ i+j+k \leq 3}}^{3} a_{ijk} \delta C^i \delta D^j \delta E^k, \quad Fy = \sum_{\substack{i,j,k=0 \\ i+j+k \leq 3}}^{3} b_{ijk} \delta C^i \delta D^j \delta E^k,$$

$$Fz = \sum_{\substack{i,j,k=0 \\ i+j+k \leq 3}}^{3} c_{ijk} \delta C^i \delta D^j \delta E^k)$$

the coefficients ($a_{ijk}$, $b_{ijk}$, $c_{ijk}$) of the polynomial functions are determined from all the data (Fx, Fy, Fz, δC, δD, δE) drawn from experimental statistics or obtained from numerical calculations for example by the finite element method.

In this way, it is possible to determine for each type of tire the functions directly giving the forces Fx, Fy, Fz as a function of the deformations measurable at these same points (for example, C, D, E) when the tire is in use. It goes without saying that this method can be applied in part, for example, to determine only the component Fy without attempting to establish Fx or Fz or their contributions as regards the torsion of the side walls, since the expression Fy is directly obtained as a function of the measurements at the different points. It is clear that the coefficients of the transfer functions may be determined for any measurement configuration, since this method is not limited to the configuration (C, D, E) selected in order to illustrate it. It is only convenient to use an identical configuration when determining the coefficients and when later implementing the measurement method. It is also possible to use different configurations (for example symmetrical ones) and to deduce the final coefficients (those which will be used to implement the method according to the invention) from the coefficients determined, since they are linked by a known relationship.

Figure 5:
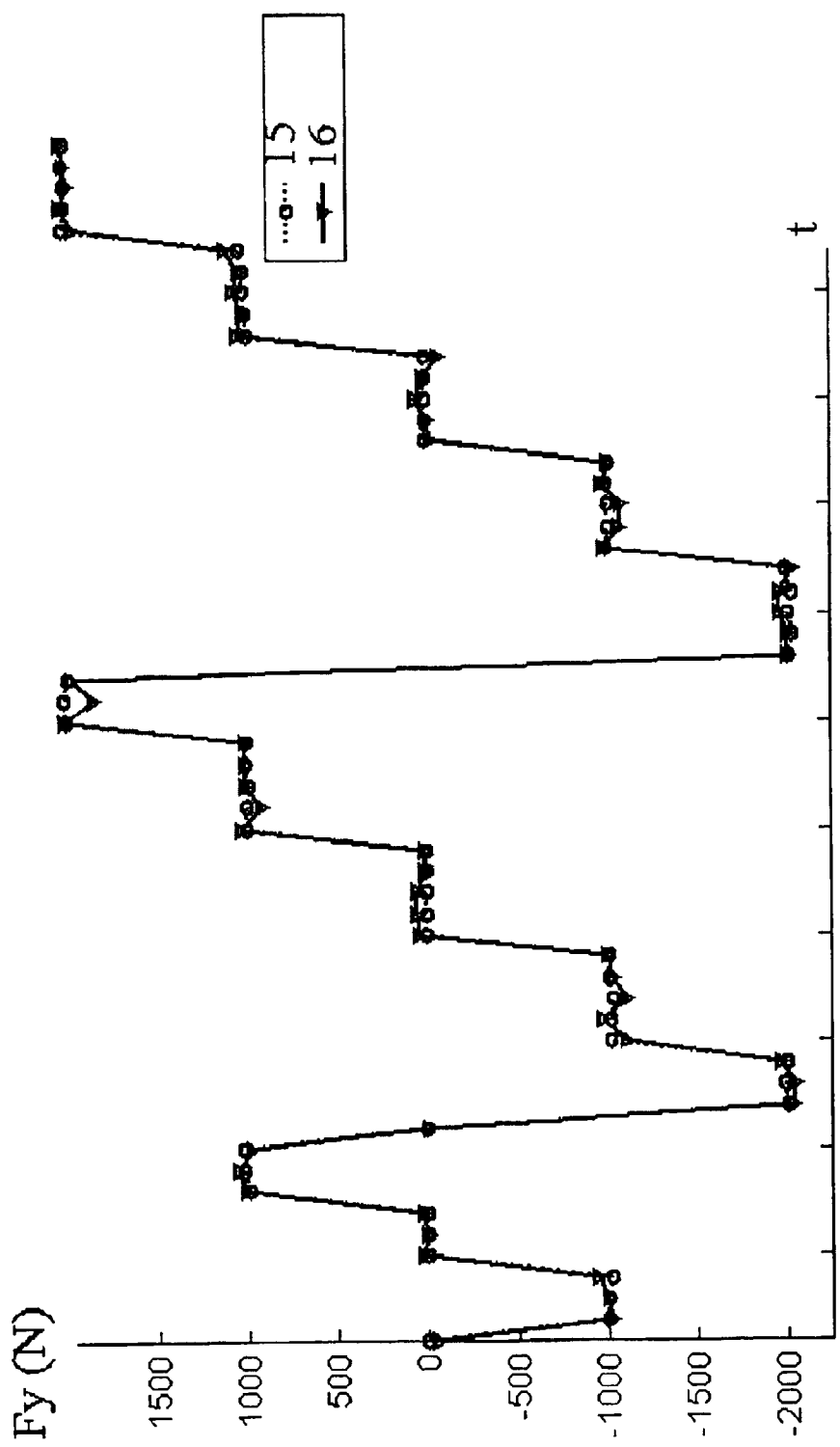
FIG. 5 shows a comparative graph of the transverse component of the forces undergone by the tire and the transverse component of the forces deduced from the angular circumferential deformation measured on the tire by the method according to the invention.

FIG. 5 shows a comparison example of deduced values and actual values of the forces exerted in the tread. The graph 15 represents the variation over time (t) in the actual component Fy of the forces imposed by a test machine in accordance with an experimental plan. The graph 16 represents the corresponding variation in the component Fy deduced directly by the method according to the invention from the angular circumferential deformation measured at points C, D and E of a single side wall of a tire. The transfer functions were determined experimentally by the method described above. The precision obtained is clearly displayed from the fact that the two graphs (15, 16) are virtually superimposed at any given moment.

It goes without saying that many other variables (in addition to the measurements of angular circumferential deformation δC, δD and δE) may be taken into account in accordance with the same principle in order to improve the effectiveness of this determination (for example the pressure or temperature of the tire).

In general, the number of measurement points may be greater than the minimum configurations presented in the examples and may allow a more precise (by using average or weighted values) or a more reliable result (by making probability checks) because of the redundancy of the information available. Moreover, a device of this kind would enable satisfactory operation in the event of partial degradation of the measurement means. To this end, additional measurements may also be made at azimuthal points other than those presented or for the same points but on their opposing side wall.

Apart from the angular circumferential deformation, the forces exerted in the area of contact will of course cause other types of deformation in the tire. Among these there may be mentioned the extension of the tread or the transverse offset of the tread with respect to the beads. The measurement of these deformations may enable the precision and/or reliability of determining the components of the forces to be improved by combining these measurements with those of the angular circumferential deformation. The transverse offset is mainly linked to the component Fy of the forces. Thus, the combination of this measurement (or a measurement linked to the offset) with that of the angular circumferential deformation allows even more precise determination of the different components and in particular the transverse component Fy to be made. The measurement of other types of tire deformations may also enable the number of measurement points of the angular circumferential deformation to be limited while giving equivalent precision and/or reliability. One criterion determining the advantage of these additional or alternative measurements is of course the complexity of the measuring device.

The measurements of the angular circumferential deformation of the side walls may be made in any way. For example, a phase shift between a signal linked to a point close to the shoulder and a similar signal linked to a point close to the bead of the tire may be measured. This signal may for example be optical or magnetic as described in U.S. Pat. No. 5,913,240. The device described in this patent enables the angular circumferential deformation and the transverse offset of the tread to be measured simultaneously by a single means. In fact, the signal emitted by the sensors allows the phase shift (and thus the angular circumferential deformation) to be determined, while the amplitude of the signal of the same sensors is an image of the proximity of the side wall (and thus of the transverse offset).

In general, there is understood here by "tire" any type of elastic casing, pneumatic or otherwise, subject to internal pressure or otherwise.

As explained above, the method according to the invention essentially has the object of determining the transverse forces (Fy) in a simple and reliable manner and also enables the other components (Fx and Fz) to be calculated where this is necessary. Thus, on a vehicle, if these measurements are made for each wheel, it is possible to know the overall effect of all the forces acting on the vehicle and thus the accelerations it undergoes. This information is useful for certain guiding or handling management systems such as ESP (see above).

What is claimed is:

1. A method for determining a transverse component (Fy) of a resultant of forces exerted through the roadway (3) on a contact area (2) of a tire (1), comprising the steps of:

measuring a first angular circumferential deformation ($\delta f(B)$) in a first side wall (4) of the tire (1) at a first fixed point (B) in space which is located at an azimuth ($\phi$) along the circumference of the tire (1), which azimuth differs from an azimuth of the center of the area of contact (2) and differs from an azimuth of the point opposite the center of the area of contact (2), measuring a second angular circumferential deformation ($\delta a(B)$) in a second side wall (4') of the tire (1) at a second fixed point (C) in space which is located at an azimuth ($-\phi$) along the circumference of the tire (1), which azimuth differs from an azimuth of the center of the area of contact (2) and differs from an azimuth of the point opposite the center of the area of contact (2), and, determining from a difference between the first and second angular measurements a transverse component (Fy) of resultant forces.

2. A method according to claim 1, further comprising the steps of:

measuring an angular circumferential deformation in said first side wall (4) at a second fixed point (C) in space which is distinct from the first point (B) and located at an azimuth ($-\phi$) substantially opposite the first point (B) to obtain a third measurement ($\delta f(C)$), and, determining a longitudinal component (Fx) of said resultant of forces exerted through the roadway (3) from a sum of said first and third measurements.

3. A method according to claim 2, further comprising the step of determining a vertical component (Fz) of a resultant of forces exerted through the roadway (3) from a difference between said third and first measurements and a contribution ($\gamma f$) of the transverse component (Fy).

4. A method according to claim 1, wherein the azimuth ($\phi$) of the first point (B) is substantially equal to 90°.

5. A method according to claim 1, further comprising the step of determining a longitudinal component (Fx) and a vertical component (Fz) of said resultant of forces exerted through the roadway from measurements of an angular circumferential deformation of at least one side wall (4) of the tire (1) at at least three distinct points (C, D, E) fixed in space along the circumference of the tire.

6. A method according to claim 5, wherein the components of the forces are determined from measurements of the angular circumferential deformation of a single side wall (4) of the tire.

7. A method according to claim 1, wherein the step of determining the transverse component of force further comprises combining a measurement of the transverse offset of the tread with the at least one measurement of the angular circumferential deformation of the sidewall.

* * * * *